Figure 1:
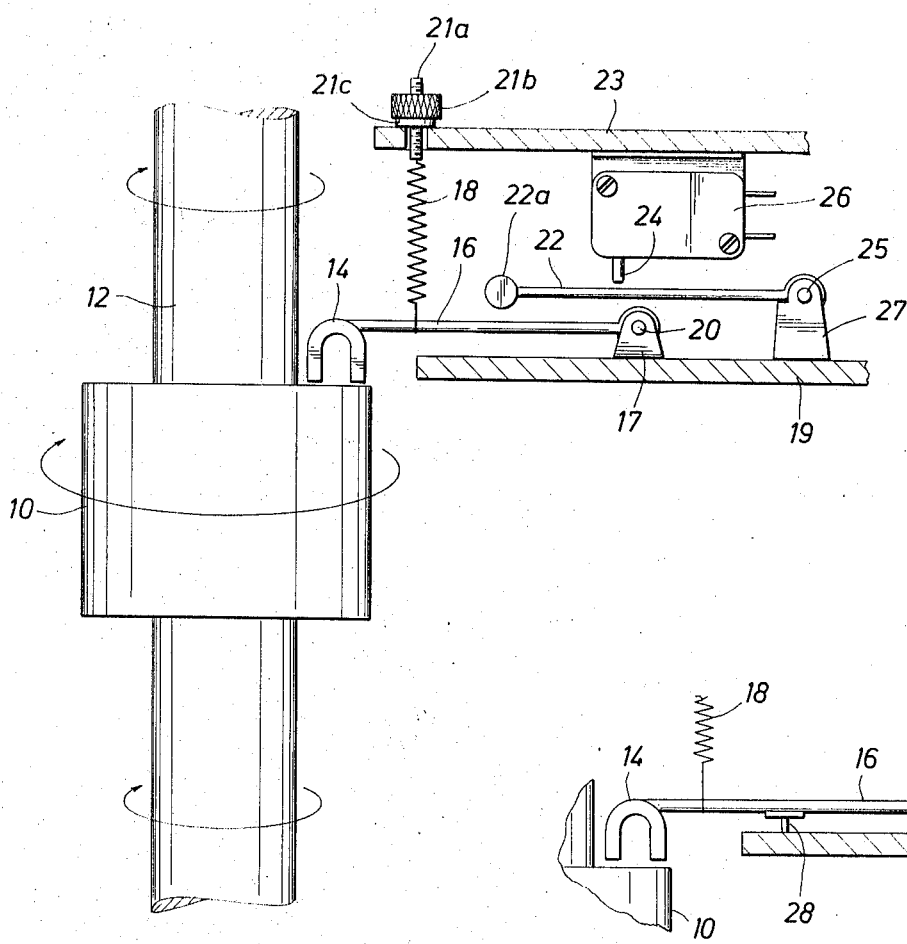

United States Patent [19]
Aldag

[11] 3,853,087
[45] Dec. 10, 1974

[54] BEARING FAILURE INDICATOR

[75] Inventor: David B. Aldag, Clinton, Okla.

[73] Assignee: Panhandle Eastern Pipe Line Company, Houston, Tex.

[22] Filed: June 29, 1973

[21] Appl. No.: 374,987

[52] U.S. Cl. ........ 116/114 R, 116/67 R, 116/114 Q, 200/61.53, 308/1 A, 340/269
[51] Int. Cl. ........................................... G01d 21/00
[58] Field of Search ............ 116/67, 114 R, 115, 74, 116/114 Q; 73/37, 37.5; 308/1 A, 108, 135, 165, 219; 188/1 A; 200/61.41, 61.42, 61.46, 61.45 M, 61.53; 340/267 R, 269, 271

[56] References Cited
UNITED STATES PATENTS

| | | | |
|---|---|---|---|
| 2,628,337 | 2/1953 | Getz | 340/271 X |
| 2,901,076 | 8/1959 | Dean | 340/271 X |
| 3,761,911 | 9/1973 | Hiltz et al. | 340/271 |
| 3,797,451 | 3/1974 | Tiraspolsky et al. | 116/114 Q |

*Primary Examiner*—Louis J. Capozi
*Attorney, Agent, or Firm*—Jennings B. Thompson

[57] ABSTRACT

A magnet is positioned adjacent a shaft of magnetizable material and supported for movement in the direction the shaft moves when the bearings supporting the shaft fail. The magnet is urged in the direction that the shaft would move by the magnetic attraction between the magnet and the shaft. It is held against such movement by a spring alone or by a spring in combination with a mechanical stop. When the bearings fail, the shaft will move away from the magnet decreasing the force of the magnetic attraction between the magnet and the shaft and the spring will be able to overcome this decreased force and move the magnet away from the shaft. A switch is actuated by such movement to indicate that the bearing has failed.

8 Claims, 2 Drawing Figures

PATENTED DEC 10 1974　　　　3,853,087

BEARING FAILURE INDICATOR

This invention relates to an indicator of the failure of the bearing or bearings supporting a rotating shaft.

When the bearing supporting a rotating shaft fails, quite often additional damage is done to the machine before it can be stopped. For example, in a pump having a vertical drive shaft, when the thrust bearings supporting the shaft fail, the shaft drops and breaks the seal between the shaft and the housing of the pump. This results in high pressure liquid being sprayed over the adjacent area which may result in injury to personnel and damage to other machines in the adjacent area.

Therefore, it is an object of this invention to provide an indicator that will signal when the bearing or bearings supporting a shaft have failed so that the machine can be shut down quickly to reduce the chance of injury to personnel, further damage to the machine itself, or to the other machinery in the adjacent area.

It is another object of this invention to provide a bearing failure indicator that senses the movement of the shaft due to bearing failure without being physically connected to the shaft.

These and other objects, advantages, and features of this invention will be apparent to those skilled in the art from a consideration of this specification, including the attached drawings and appended claims.

Figure 2:
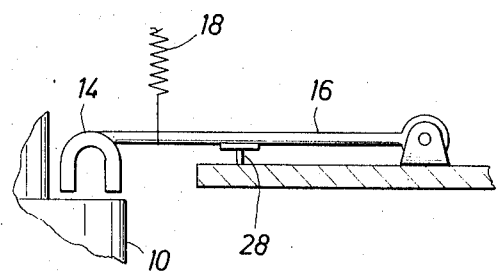

In the drawings:

FIG. 1 is a view partially in section and partially in elevation of the preferred embodiment of the bearing failure indicator of this invention arranged to indicate the failure of the bearing supporting a vertical shaft; and FIG. 2 is a view of an alternate embodiment of the invention.

The embodiment of the invention in the drawings is shown arranged to indicate the failure of the bearing or bearings supporting a vertical shaft. As shown, cylindrical body 10 is attached to and carried by shaft 12. Body 10 may in fact be an integral part of shaft 12. Since the magnetic attraction between a magnet and magnetizable material is employed in the operation of the device, first body 10 must be made of magnetic material.

The apparatus also includes second body 14 and either the first body 10 or second body 14 should be magnetized or, of course, both could be magnetized if desired, so that the two bodies are acted upon by a force produced by the magnetic field provided by the magnetized body or bodies. Means are provided to support second body 14 which, in this embodiment, is a permanent magnet, for movement relative to the first body due to the force imposed thereon by the magnetic field. In the embodiment shown, magnet 14 is mounted at the end of rod 16, which in turn is pivotally connected to bearing block 17 by pin 20. Bearing block 17 is mounted on base 19.

Means are provided to hold the second body in a preselected position relative to the first body in opposition to the force of the magnetic field when the shaft is properly supported by its bearings. In the embodiment shown, such holding force is provided by spring 18 that is connected between rod 16 and adjusting screw 21a. Adjusting nut 21b rides on washer 21c that engages support plate 23 to allow the tension in spring 18 to be adjusted. As shown, then, magnet 14 is attracted to body 10 by the magnetic field provided by the magnet. Coil spring 18 resists the movement of magnet 14 toward the body and can be adjusted to hold the magnet in a preselected spaced position from body 10 when the bearings are in good shape and supporting the shaft in the position shown. As the bearings fail, shaft 12 will drop down, moving body 10 away from magnet 14 decreasing the force exerted on magnet 14 by the magnetic attraction between it and body 10. When this force is decreased sufficiently, coil spring 18 will move rod 16 around pivot pin 20 and move magnet 14 to another position.

In accordance with this invention, means responsive to said movement of the second body or magnet to another position indicate that the bearing supporting the shaft has failed. In the embodiment shown, rod 22 supports ball 22a on one end, while its other end is pivotally supported by pin 25 and bearing block 27. Attached to mounting plate 23 is electrical switch 26. It is positioned with its actuator arm 24 located to be engaged by pivot rod 22 when spring 18 moves rod 16 upwardly when the bearing fails. By actuating the switch, an electrical signal can be provided to stop the operation of the machine, to turn on a light, blow a whistle, or all of these things, as desired by the operator of the machinery.

In FIG. 2, an additional element is introduced in mechanical stop 28. The rest of the elements remain the same, therefore they will be assigned the same numbers as shown in FIG. 1. Mechanical stop 28 will allow spring 18 to be adjusted to provide only a portion of the force required to overcome the magnetic attraction between magnet 14 and body 10. In this way, the force of attraction between these two bodies can decrease to a predetermined amount by the downward movement of body 10 before spring 18 can overcome the force of the magnetic attraction and move rod 16 up to actuate switch 26. This particular embodiment may be advantageous where a bearing will wear allowing some downward movement of the shaft, but still have considerable life left in it. Usually, however, the bearings are designed to support the shaft in a predetermined position until they fail with little or no change in the position of the shaft due to wear of the bearing until the bearing is at the point of failure.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A bearing failure indicator for shafts comprising first and second bodies of magnetizable material at least one of which is magnetized, means attaching the first body to the shaft, means supporting the second body for movement relative to the first body due to the force imposed thereon by the magnetic field, means exerting a resilient force on the second body opposing the force of the magnetic field and holding the second body in a first position relative to the first body when the first body is in the position it occupies when the shaft is properly supported by its bearings and to move the second body to a second position relative to the first body when the first body moves due to the failure of the bearings supporting it and the shaft and means responsive to the movement of the second body to indicate the failure of the shaft support bearings.

2. The bearing failure indicator of claim 1 in which the first body is a portion of the shaft.

3. The bearing failure indicator of claim 1 in which the first body comprises an annular member having a surface in a plane transverse the longitudinal axis of the shaft and the second body is a magnet that is attracted to the first body and held by said resilient means adjacent said transverse surface when the second body is in its first position.

4. The bearing failure indicator of claim 3 further provided with stop means to combine with the resilient means to hold the second body in its first position to allow the first body to move a predetermined distance from the second before the resilient means can move the second body to said second position.

5. A bearing failure indicator for shafts of magnetizable material comprising a magnet, means mounting the magnet adjacent the shaft to be urged by the force of the magnetic attraction between the magnet and the shaft in the direction the shaft will move when the bearing supporting the shaft fails, means resisting the force of the magnetic attraction to hold the magnet in a preselected position relative to the shaft when the shaft is properly supported by its bearings, means for moving the magnet away from said position when the shaft moves thereby reducing the force of the magnetic attraction between the magnet and the shaft, and means responsive to said movement of the magnet to indicate such bearing failure.

6. The bearing failure indicator of claim 5 in which the means for holding and for moving the magnet comprises spring means that exerts a resilient force on said magnet.

7. The bearing failure indicator of claim 6 in which the spring means includes means for adjusting the resilient force exerted on the magnet by the spring means.

8. The bearing failure indicator of claim 5 in which the means for holding the magnet in said position comprises stop means and in which said magnet moving means comprises a spring.

* * * * *